(12) United States Patent
Salah

(10) Patent No.: US 10,583,727 B2
(45) Date of Patent: Mar. 10, 2020

(54) ENERGY STORAGE HOUSING, VEHICLE WITH AN ENERGY STORAGE HOUSING, AND SET OF ENERGY STORAGE HOUSINGS

(71) Applicant: Bayerische Motoren Werke Aktiengesellschaft, Munich (DE)

(72) Inventor: Semi Ben Salah, Finsing (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/109,848

(22) Filed: Aug. 23, 2018

(65) Prior Publication Data

US 2018/0361841 A1 Dec. 20, 2018

Related U.S. Application Data

(63) Continuation of application No. PCT/EP2017/051467, filed on Jan. 25, 2017.

(30) Foreign Application Priority Data

Feb. 25, 2016 (DE) .................. 10 2016 202 909

(51) Int. Cl.
*B60K 1/04* (2019.01)
*B60L 50/60* (2019.01)

(52) U.S. Cl.
CPC ............ *B60K 1/04* (2013.01); *B60L 50/66* (2019.02); *B60K 2001/0422* (2013.01); *B60K 2001/0433* (2013.01)

(58) Field of Classification Search
CPC .... B60K 2001/0422; B60K 2001/0433; B60K 2001/0438

(Continued)

(56) References Cited

U.S. PATENT DOCUMENTS

| 4,216,839 A * | 8/1980 | Gould ...................... B60K 1/04 104/34 |
| 4,252,206 A * | 2/1981 | Burkholder .............. B60K 1/04 180/68.5 |

(Continued)

FOREIGN PATENT DOCUMENTS

| DE | 11 2006 002 931 T5 | 9/2008 |
| DE | 10 2009 037 870 A1 | 2/2011 |

(Continued)

OTHER PUBLICATIONS

International Search Report (PCT/ISA/210) issued in PCT Application No. PCT/EP2017/051467 dated Apr. 7, 2017 with English translation (five pages).

(Continued)

*Primary Examiner* — Jeffrey J Restifo
(74) *Attorney, Agent, or Firm* — Crowell & Moring LLP

(57) ABSTRACT

An energy storage housing for assembly on the lower face of a vehicle includes a first sub-housing which surrounds a first plurality of energy storage modules, a second sub-housing which surrounds a second plurality of electric energy storage modules, and a connection channel which connects the first sub-housing to the second sub-housing. The connection channel has a variable length. A vehicle is equipped with such an energy storage housing or a set of energy storage housings, wherein in a set all first sub-housings of the set are identical, all second sub-housings of the set are identical, and the connection channels of the energy storage housings of the set have different lengths.

9 Claims, 3 Drawing Sheets

(58) Field of Classification Search
USPC .......................................... 180/68.5; 429/99
See application file for complete search history.

(56) References Cited

U.S. PATENT DOCUMENTS

| | | | | |
|---|---|---|---|---|
| 5,547,160 | A * | 8/1996 | Johnson | B60R 16/04 180/68.5 |
| 6,629,737 | B2 * | 10/2003 | Wiggins | A47B 57/58 180/68.5 |
| 6,871,829 | B2 * | 3/2005 | Shannon, Jr. | A47G 11/002 180/68.5 |
| 7,771,865 | B2 * | 8/2010 | Takasaki | B60K 1/04 429/71 |
| 7,828,099 | B2 * | 11/2010 | Heckeroth | B60K 1/00 180/68.5 |
| 8,464,817 | B2 * | 6/2013 | Usami | B60K 1/04 180/68.5 |
| 8,479,858 | B2 * | 7/2013 | Kodaira | B60K 1/04 180/68.5 |
| 8,770,331 | B2 * | 7/2014 | Lim | B60K 1/04 180/68.5 |
| 8,905,170 | B2 * | 12/2014 | Kyoden | B62M 7/12 180/220 |
| 9,033,085 | B1 * | 5/2015 | Rawlinson | B60L 11/1877 180/68.5 |
| 9,048,484 | B2 * | 6/2015 | Hatta | B60K 1/04 |
| 9,102,362 | B2 * | 8/2015 | Baccouche | B62D 21/157 |
| 9,216,638 | B2 * | 12/2015 | Katayama | B60K 1/04 |
| 9,227,582 | B2 * | 1/2016 | Katayama | B60K 1/04 |
| 9,428,059 | B2 * | 8/2016 | Galamb | B60L 3/0046 |
| 9,821,645 | B2 * | 11/2017 | Hayashi | B60K 1/00 |
| 9,925,890 | B2 * | 3/2018 | Enning | B60K 1/04 |
| 9,969,283 | B2 * | 5/2018 | Deahl | E21F 13/025 |
| 10,093,364 | B2 * | 10/2018 | Seo | B62D 37/04 |
| 2009/0226792 | A1 * | 9/2009 | Hamada | B60K 1/00 429/413 |
| 2011/0297469 | A1 * | 12/2011 | Usami | B60K 1/04 180/68.5 |
| 2013/0299257 | A1 * | 11/2013 | Erlacher | B60K 1/04 180/68.5 |

FOREIGN PATENT DOCUMENTS

| | | |
|---|---|---|
| DE | 10 2010 014 484 A1 | 3/2011 |
| DE | 10 2011 102 019 A1 | 12/2011 |
| DE | 10 2011 122 101 A1 | 9/2012 |
| DE | 10 2014 008 312 A1 | 12/2015 |
| EP | 2 662 230 A1 | 11/2013 |
| WO | WO 2013/053433 A1 | 4/2013 |

OTHER PUBLICATIONS

German-language Written Opinion (PCT/ISA/237) issued in PCT Application No. PCT/EP2017/051467 dated Apr. 7, 2017 (five pages).
German-language Search Report issued in counterpart German Application No. 10 2016 202 909.6 dated Oct. 20, 2016 with partial English translation (12 pages).

* cited by examiner

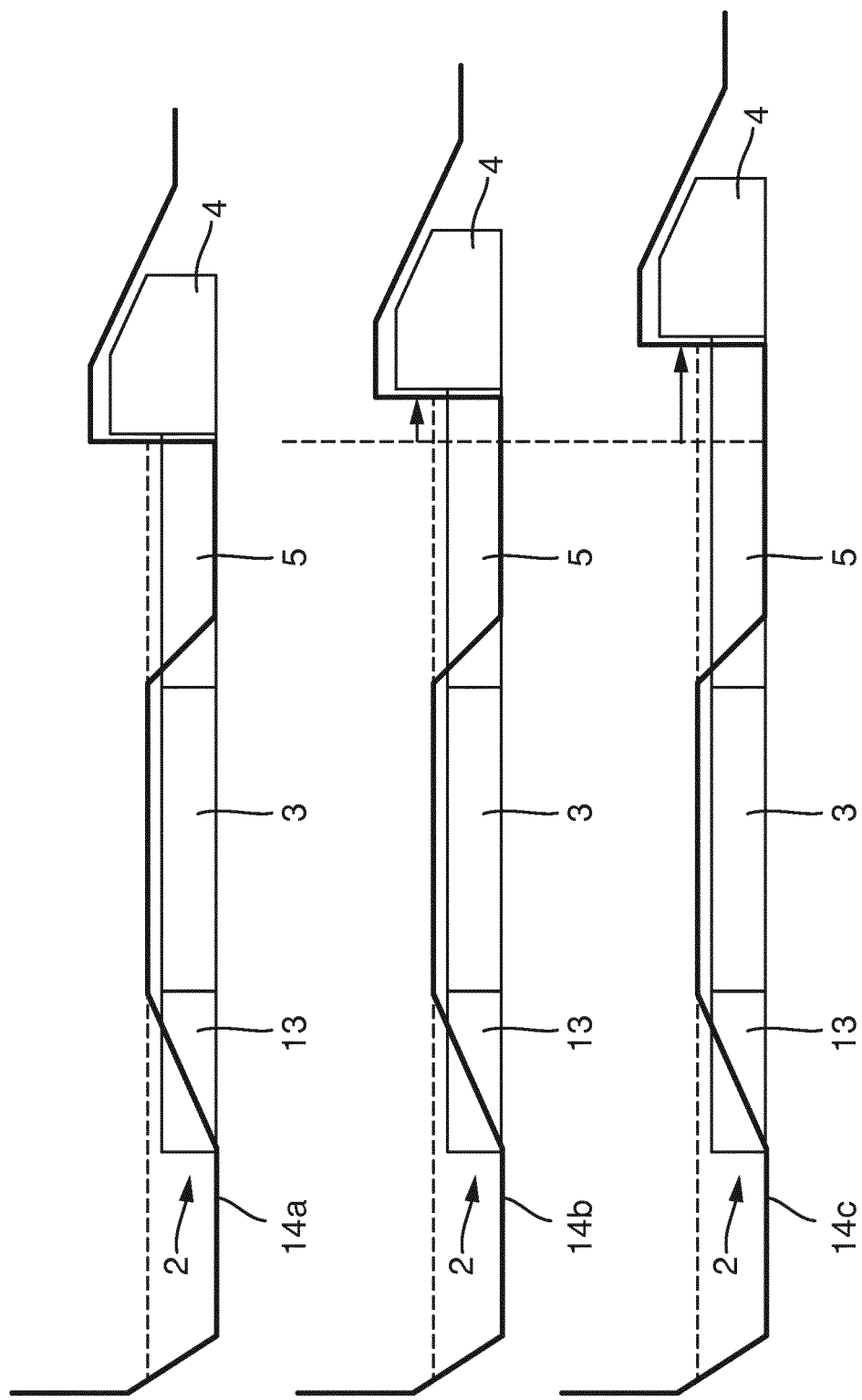

ENERGY STORAGE HOUSING, VEHICLE WITH AN ENERGY STORAGE HOUSING, AND SET OF ENERGY STORAGE HOUSINGS

CROSS REFERENCE TO RELATED APPLICATIONS

This application is a continuation of PCT International Application No. PCT/EP2017/051467, filed Jan. 25, 2017, which claims priority under 35 U.S.C. § 119 from German Patent Application No. 10 2016 202 909.6, filed Feb. 25, 2016, the entire disclosures of which are herein expressly incorporated by reference.

BACKGROUND AND SUMMARY OF THE INVENTION

The invention relates to an energy storage housing for assembly on a lower face of a vehicle and to a vehicle having such an energy storage housing. Furthermore, the invention relates to a set of energy storage housings.

In high-voltage storage units for electric and hybrid vehicles, continuous flat storage units between the front and rear axles are known. Especially in low-profile vehicles it is difficult, because of the low seat position of a rear seat bench, to find adequate space between the road surface and the foot support surface for integrating a continuous storage unit.

For this reason it is often required to adapt and scale the placement of an energy storage unit on the vehicle floor for each vehicle model. These adaptations cause a relatively high development expenditure and high tooling investments.

The object of the invention therefore is to provide an energy storage housing across vehicle models which does not negatively affect the arrangement of a foot support surface assigned to the rear seat bench.

This and other objects are achieved with an energy storage housing, a vehicle having such an energy storage housing, and a set of the energy storage housings in accordance with embodiments of the invention.

According to an exemplary embodiment of the invention, an energy storage housing for assembly on a lower face of a vehicle is provided, with a first sub-housing, which surrounds a first plurality of energy storage modules, a second sub-housing, which surrounds a second plurality of electric energy storage modules, and a connection channel, which connects the first to the second sub-housing, wherein the connection channel is variable in length. Because of the connection channel that is variable in length, a contiguous energy storage housing with a relatively large total area can be made available without undesirably increasing the foot support area in the region of a rear seat bench, which is adapted for assembly on different vehicle models. Because of this, costs for tools, but also development expenditure for the integration in the vehicle are saved.

According to a further exemplary embodiment of the invention, the first and second sub-housing are each substantially formed rectangularly.

According to a further exemplary embodiment of the invention, the connection channel is provided with a bellows at least in sections.

According to a further exemplary embodiment of the invention, the connection channel comprises sections that can be slid into one another in a telescope-like manner.

In addition to this, the invention provides a vehicle with an energy storage housing according to any one of the preceding exemplary embodiments.

According to a further development of the vehicle, the first and second sub-housing each extend at least over half of the width of the vehicle lower face.

According to a further development of the vehicle, the first sub-housing is arranged behind a foot region, which is assigned to a seat installation, which is arranged behind a driver's seat.

In addition, the invention provides a set of energy storage housings each for assembly on a lower face of a vehicle, wherein each energy storage housing is formed with a first sub-housing, which surrounds a first plurality of energy storage modules, a second sub-housing, which surrounds a second plurality of electric energy storage modules, and a connection channel, which connects the first to the second sub-housing, wherein all first sub-housings of the set are identical, all second sub-housings of the set are identical and the connection channels of the energy storage housing of the set have different lengths.

According to a further development of the set, the first sub-housing, the second sub-housing and the connection channel are not non-destructively detachably connected to one another in each of the energy storage housings of the set.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 shows schematically a lateral view of the set of energy storage housings according to an exemplary embodiment of the invention.

DETAILED DESCRIPTION OF THE DRAWINGS

Figure 1:
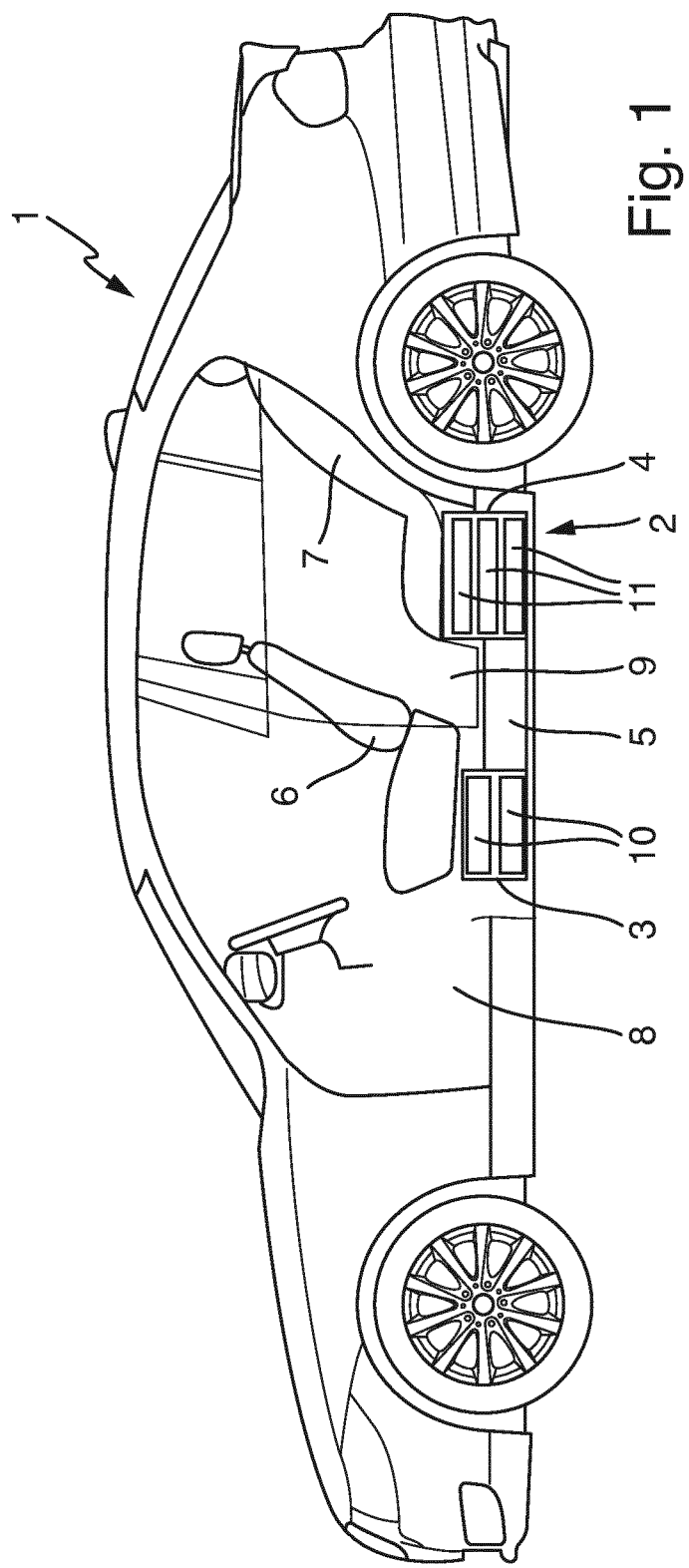
FIG. 1 is a lateral view of a vehicle with the energy storage housing according to an embodiment of the invention.

FIG. 1 shows a lateral view of a vehicle 1 with an energy storage housing 2. The vehicle is, for example, a hybrid or electric vehicle. The energy storage housing 2 comprises a first sub-housing 3, a second sub-housing 4 and a connection channel 5. The vehicle has a front seat row, which includes a seat installation 6, such as for example a driver's and front passenger seat, and a rear seat row, which seen in the vehicle longitudinal direction is arranged behind the front seat row and a seat installation 7, such as for example a rear seat bench. The front seat row is assigned a foot region 8, which comprises one or more foot spaces (one continuous or two separated foot spaces). The rear seat row is assigned a foot region 9, which comprises one or more foot spaces (one continuous or two separated foot spaces). The first sub-housing 3 is arranged between the foot region 8 and the foot region 9 and below the seat installation 6 of the front seat row. The second sub-housing 4 is arranged behind the foot region 9 and preferentially below the seat installation 7 of the rear seat row. The region below the foot region 9 is free of the first and second sub-housing. The region below the foot region 9 is also free of electric energy storage units, which supply electric energy for driving the vehicle 1.

The first sub-housing 3 comprises a plurality of energy storage modules 10 and the second sub-housing 4 comprises a plurality of energy storage modules 11. Each of the energy storage modules 10, 11 comprises a plurality of energy storage cells, which are preferentially connected in series (a parallel connection is also possible). The energy storage modules 10, 11 are preferentially connected parallel to one another (a series connection is also possible) and together form an electric energy storage unit which supplies electric energy for driving the vehicle 1. The electric energy storage unit is, in particular, a high-voltage storage unit with a voltage level of 48V and more, preferentially more than 150V. The connection channel 5 extends linearly from the first sub-housing 3 to the second sub-housing 4. Additionally, a channel of the same or similar cross section can extend linearly from the first sub-housing 3 and/or behind the second sub-housing 4.

Figure 2:
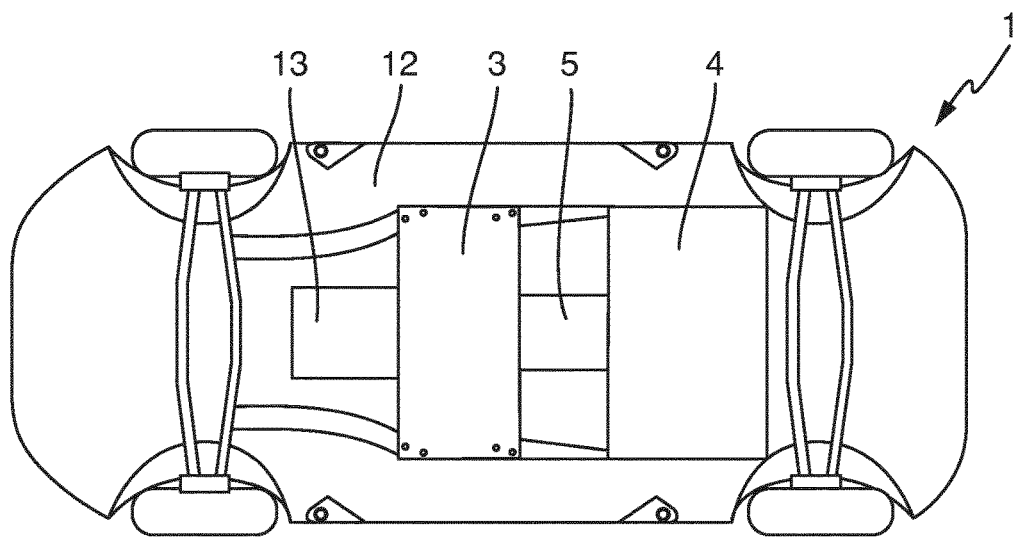
FIG. 2 shows a lower face of the vehicle with the attached energy storage housing.

FIG. 2 shows a lower face of the vehicle 1, wherein from this representation the placement of the energy storage housing 2 is evident. As is evident, the first sub-housing 3 and the second sub-housing 4 substantially have the same width (transversely to the vehicle longitudinal direction on the vehicle lower face). The minimal width of the respective sub-housing 3 and 4 corresponds at least to half of the maximum width of the vehicle lower face. The sub-housings 3 and 4 can be directly mounted on a vehicle underbody 12. However, an assembly bracket is preferentially fastened to the vehicle underbody 12, which for example corresponds to the contour of the energy storage housing 2, is designed plate-like and on which the energy storage housing 2 is fastened, for example by means of a screw connection.

Figure 3:
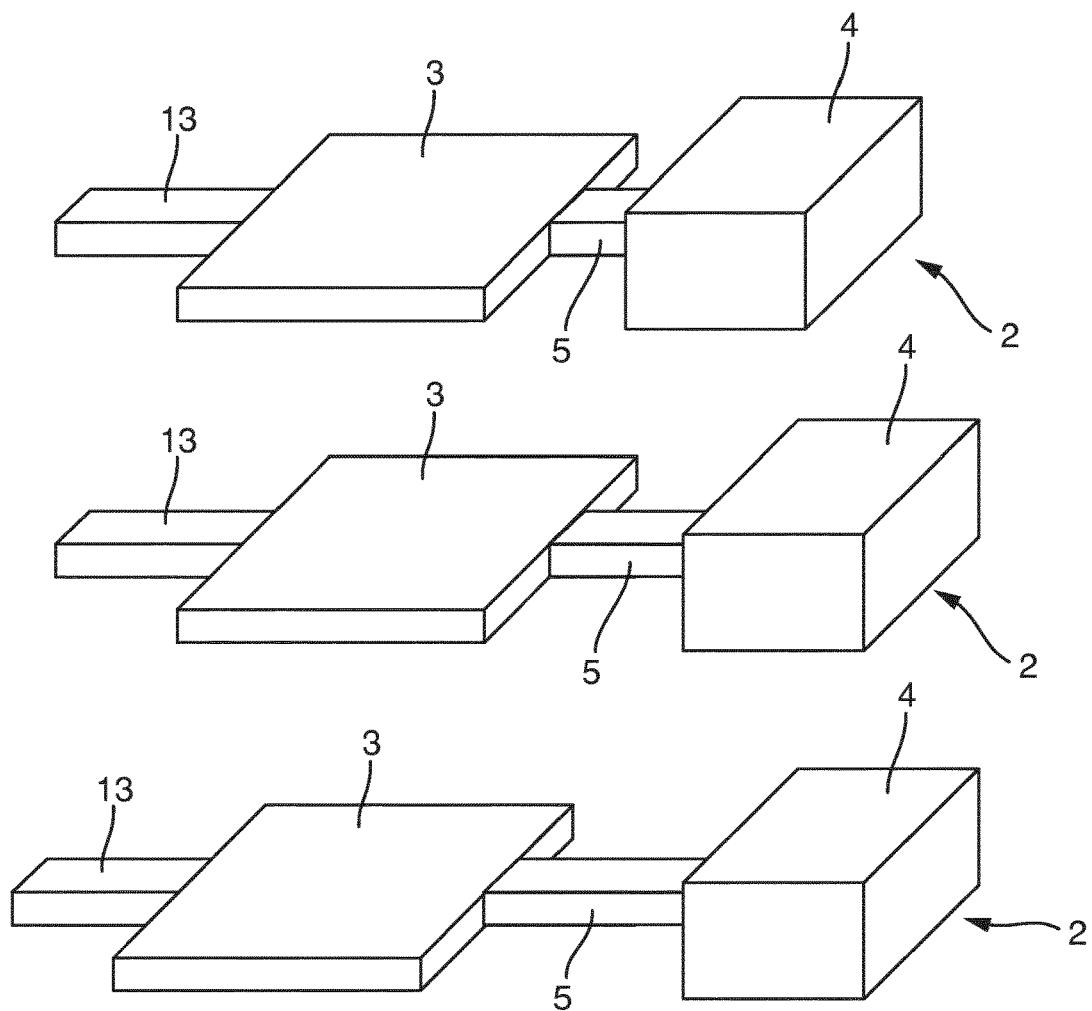
FIG. 3 shows schematically a three-dimensional view of a set of energy storage housings according to an exemplary embodiment of the invention.

FIG. 3 shows schematically a set of energy storage housings according to an exemplary embodiment of the invention. The set comprises multiple energy storage housings 2, each with the first sub-housing 3, the second sub-housing 4 and the connection channels 5 located in between. In FIG. 3, a channel 13 is arranged in front of the sub-housing 3 additionally to the connection channel 5.

Preferentially, the first sub-housing 3 and the second sub-housing 4 are substantially rectangular. The connection channel 5 has a maximum width which preferentially amounts to at maximum a third of the maximum width of the sub-housing 3 and of the sub-housing 4. In the interior, the connection channel forms an elongated hollow space which is adapted for receiving electrical connections and cooling lines. The electrical connections on the one hand comprise lines for energy withdrawal and energy supply from/to the energy storage unit and on the other hand control lines for the electronic control of the energy storage unit. Furthermore, the elongated hollow space can be optionally adapted for receiving other supply and control lines. At the connection point between the first sub-housing 3 and the connection channel 5, as well as at the connection point between the second sub-housing 4 and the connection channel 5, the connection channel is connected to the respective sub-housing preferentially via a not non-destructively detachable connection, such as for example a rivet connection, welded connection, soldered connection or bonded connection. However, a detachable connection, such as for example a screw or clip-on connection can also be provided. The connection channel 5 and the sub-housings 3 and 4 can also be formed in one piece of the same material.

The energy storage units 2 differ within the set only in that the connection channels 5 in the state as mounted on the vehicle have a different length, as is evident from FIG. 3. This can be achieved in that the connection channel 5 is variable in length in that at least one section of the connection channel 5 is formed variable in length, for example by way of a bellows, a material-elastic section or by sections which can be slid into one another in a telescoping manner. Depending on the extent to which this section that is variable in length is pulled apart, the different lengths of the connection channel 5 shown in FIG. 3 are obtained. The advantage is that an identical energy storage unit 2 for assembly on different vehicle models, which for example differ by their length dimensions, can thus be mounted. This provides synergistic effects and an adaptation of the energy storage housing 2 to certain vehicle models can be omitted. A further possibility of achieving these advantages is that the connection channels 5 of the respective energy storage housings 2 within a set are cut off in different lengths or are made available in different lengths. In this case, the connection channel 5 itself is not variable in length but a set of different length energy storage housings 2 can be provided merely by providing the connection channel 5 in different lengths, with identical first sub-housing 3 and second sub-housing 4. The respective energy storage housings 2 within a set would then be each adapted for different vehicle models.

FIG. 4 shows a lateral view of the set of energy storage housings 2 and their assembly on the respective lower faces of vehicles 1 of different vehicle models. The energy storage housings 2 are mounted on respective floor panels 14a, 14b and 14c. Here, the floor panels 14a to 14c extend with respect to the vehicle longitudinal direction in the region of the sub-housing 3 above the sub-housing 3 and with respect to the vehicle longitudinal direction in the region of the sub-housing 4 above the sub-housing 4. With respect to the vehicle longitudinal direction in the region of the foot space 8 and 9, the floor panel for the greatest part (more than half in the vehicle longitudinal direction) extends at a height below the connection channel 5. As is evident, the floor panels 14a, 14b and 14c differ in that the floor panel section from a rear end of the first sub-housing 3 to a front end of the second sub-housing 4 is different in length in the direction of the vehicle longitudinal axis.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage housing for assembly on a lower face of a vehicle, comprising:
   a first sub-housing, which is formed as a first enclosed box and which first enclosed box surrounds a first plurality of energy storage modules;
   a second sub-housing, which is formed as a second enclosed box and which second enclosed box surrounds a second plurality of energy storage modules; and
   a connection channel, which connects the first to the second sub-housing, wherein the connection channel is variable in length;
   wherein the connection channel forms an elongated hollow space and wherein an electrical connection line is disposed in the hollow space.

2. The energy storage housing as claimed in claim 1, wherein
   the first and second sub-housings are each substantially formed rectangularly.

3. The energy storage housing as claimed in claim 1, wherein
the connection channel is provided with a bellows at least in sections.

4. The energy storage housing as claimed in claim 1, wherein
the connection channel comprises sections that are slidable into one another in a telescoping manner.

5. A vehicle, comprising an energy storage housing as claimed in claim 1.

6. The vehicle as claimed in claim 5, wherein
the first and second sub-housings each extend at least over half of a width of a lower face of the vehicle.

7. The vehicle as claimed in claim 5, wherein
the first sub-housing is arranged behind a foot region, which is assigned to a seat installation, which is arranged behind a driver's seat.

8. An energy storage housing set, comprising:
two or more energy storage housings, each for assembly on a lower face of a vehicle, wherein
each energy storage housing is formed with a first sub-housing, which is formed as a first enclosed box and which first enclosed box surrounds a first plurality of energy storage modules, a second sub-housing, which is formed as a second enclosed box and which second enclosed box surrounds a second plurality of energy storage modules, and a connection channel, which connects the first to the second sub-housing, wherein all first sub-housings of the set are identical, all second sub-housings of the set are identical, the connection channels of the energy storage housing set have different lengths, and the connection channel forms an elongated hollow space and wherein an electrical connection line is disposed in the hollow space.

9. The set as claimed in claim 8, wherein
in each of the energy storage housings, the first sub-housing, the second sub-housing and the connection channel are not non-destructively detachably connected to one another.

* * * * *